United States Patent [19]
Ball et al.

[11] Patent Number: 5,891,203
[45] Date of Patent: Apr. 6, 1999

[54] FUEL LUBRICITY FROM BLENDS OF A DIETHANOLAMINE DERIVATIVE AND BIODIESEL

[75] Inventors: Keith Frederick Ball, Midlothian; John Gray Bostick, Beaverdam; Timothy J. Brennan, Richmond, all of Va.

[73] Assignee: Ethyl Corporation, Richmond, Va.

[21] Appl. No.: 9,152

[22] Filed: Jan. 20, 1998

[51] Int. Cl.[6] .................................. C10L 1/22; C10L 1/18
[52] U.S. Cl. .................. 44/388; 44/391; 44/399; 44/418
[58] Field of Search .............................. 44/388, 391, 399, 44/418

[56] References Cited

U.S. PATENT DOCUMENTS

| | | | |
|---|---|---|---|
| 4,204,481 | 5/1980 | Malec | 123/1 A |
| 4,243,538 | 1/1981 | Shubkin | 44/418 |
| 4,428,754 | 1/1984 | Smith | 44/418 |
| 4,729,769 | 3/1988 | Schlicht et al. | 44/418 |
| 5,194,068 | 3/1993 | Mohr et al. | 44/399 |
| 5,599,358 | 2/1997 | Giavazzi et al. | 44/388 |

FOREIGN PATENT DOCUMENTS

| | | |
|---|---|---|
| A-0608149 | 7/1994 | European Pat. Off. . |
| A-0635558 | 1/1995 | European Pat. Off. . |
| B-0680506 | 11/1995 | European Pat. Off. . |

OTHER PUBLICATIONS

R. Caprotti et al., Additive Technology as a Way to Improve Diesel Fuel Quality, SAE Paper No. 922183 (1992).

P. I. Lacey et al., Diesel Fuel Lubricity, SAE Paper No. 950248 (1995).

*Primary Examiner*—Jerry D. Johnson
*Attorney, Agent, or Firm*—Dennis H. Rainear; Thomas Hamilton

[57] ABSTRACT

This invention relates to the use of blends of diethanolamine derivatives and biodiesel as an additive for improving lubricity in low sulfur fuels and to fuels and additive concentrates comprising said lubricity additives.

11 Claims, No Drawings

FUEL LUBRICITY FROM BLENDS OF A DIETHANOLAMINE DERIVATIVE AND BIODIESEL

TECHNICAL FIELD

This invention relates to the use of blends comprising diethanolamine derivatives and biodiesel as additives for improving lubricity in low sulfur fuels and to fuels and additive concentrates comprising said lubricity additives.

BACKGROUND

Biodiesel has long been known as an alternative diesel fuel. Typically, the biodiesel was used to replace hydrocarbonaceous diesel fuel. Blends of biodiesel and hydrocarbonaceous diesel fuels were also prepared in order to obtain a more environmentally friendly fuel.

Sulfur contained in fuel, for example middle distillate fuels such as diesel fuel and jet fuel, is said to constitute a serious environmental hazard. Hence strict regulations limiting the amount of sulfur which may be present in such fuels have been introduced. Unfortunately, fuels having a suitably low sulfur content exhibit very poor inherent lubricity and this can lead to problems when the fuel is used. For example, the use of low sulfur fuel in diesel engines frequently results in damage to the fuel injector pump which relies on the natural lubricating properties of the fuel to prevent component failure. There is therefore a need to improve the lubricating properties of low sulfur fuels.

EP-A-0608149 discloses the use of an ester as an additive in a liquid hydrocarbon compression-ignition fuel oil for reducing consumption of the fuel oil.

EP-B-680506 discloses the use of esters as lubricity additives in low sulfur diesel fuel. The reference does not suggest the use of blends containing derivatives of diethanolamine or teach biodiesel, specifically.

EP-A-0635558 discloses gas oil compositions containing lubricity additives which are lower alkyl esters of a mixture of saturated and unsaturated fatty acids derived from vegetable oleaginous seeds. The reference does not suggest the use of blends containing derivatives of diethanolamine.

U.S. Pat. No. 4,204,481 teaches anti-wear compression ignition fuel comprising a wear inhibiting amount of a fatty acid amide or ester of diethanolamine. The reference does not suggest blending said fatty acid amides or esters with biodiesel.

SUMMARY OF THE INVENTION

It has now been found that the lubricating properties of low sulfur-content fuels can be improved by the use of blends of diethanolamine derivatives and biodiesel. This enables mechanical failure, for example, fuel injector pump failure, caused by inadequate fuel lubricity to be avoided while retaining the environmental benefit of using a low sulfur fuel. The blends of the present invention serve as a non-acidic lubricity additive, and the lubricity additive contributes to the fuel value (energy).

DETAILED DESCRIPTION

The present invention relates to the blends of biodiesel and diethanolamine derivatives and their use as lubricity additives for low sulfur fuels.

The biodiesel of the present invention comprises lower alkyl esters of a mixture of saturated and unsaturated, straight-chain fatty acids of from 12 to 22 carbon atoms, derived from vegetable or oleaginous seeds.

According to the present invention, the expression "lower alkyl ester" means $C_1$–$C_5$ esters, in particular methyl esters and ethyl esters, with methyl ester being preferred.

The methyl esters of the saturated, monounsaturated, and polyunsaturated $C_{16}$–$C_{22}$ fatty acids, mixed with each other, are known in the market as "bio-diesel" or "rapeseed methyl ester", according to their origin.

Biodiesel is normally obtained by starting from oleaginous seeds, in particular from rapeseed, sunflower and soy bean seeds. Said seeds are submited to grinding and/or solvent extraction treatments (e.g., with n-hexane) in order to extract the oil, which is essentially constituted by triglycerides of saturated and unsaturated (mono- and polyunsaturated, in mixture with each other, in proportions depending on the selected oleaginous seed), $C_{16}$–$C_{22}$ fatty acids. Said oil is submitted to a filtration and refining process, in order to remove any possible free fats and phospholipids present, and is finally submitted to a transesterification reaction with methanol in order to prepare the methyl esters of the fatty acids, which constitute biodiesel.

A preferred biodiesel for use in the present invention is soy diesel, more particularly methyl soy ester.

The diethanolamine derivatives suitable for use in the present invention include fatty acid amides and esters of diethanolamine and mixtures thereof. The fatty acid amides or esters of diethanolamine can be made by forming a mixture of a fatty acid and diethanolamine and heating the mixture to remove water. Optionally, a water immiscible inert solvent such as toluene or xylene can be included to aid in the removal of water.

In preparing mixtures, according to one embodiment of the present invention, about 1–3 moles of fatty acid are used per mole of diethanolamine. The reaction proceeds to yield mainly amide according to the following equation

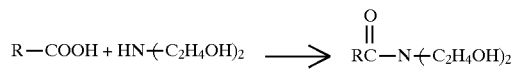

wherein R is a hydrocarbon residue of the fatty acid.

Some of the diethanolamine can react to form an ester according to the following equation

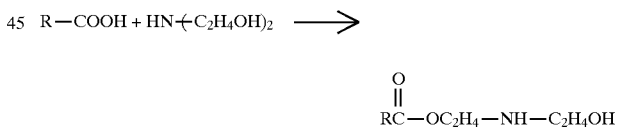

The above reaction products can be separated by distillation and used separately in diesel fuel compositions. Preferably, they are not separated, but are used as mixtures. The mixtures can also contain fatty acid ester-amides of diethanolamine. When equal mole mixtures of fatty acid and diethanolamine are reacted, very little ester-amide forms. However, whenever more than one mole of fatty acid is reacted with a mole of diethanolamine, increased amounts of ester-amide can form according to the following equations

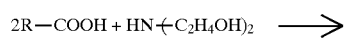

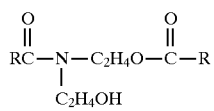

-continued

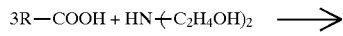

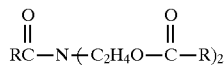

Such ester-amides are within the scope of the present invention.

Preferred fatty acids used in making the diethanolamine derivatives useful in the present invention are those containing about 8–20 carbon atoms. Examples of these include caprylic acid, pelargonic acid, capric acid, undecylic acid, lauric acid, tridecoic acid, myristic acid, stearic acid, arachidic acid, and mixtures thereof.

More preferably the fatty acid is an unsaturated fatty acid such as hypogeic acid, oleic acid, elaidic acid, erucic acid, brassidic acid and the like.

Most preferably the fatty acid is oleic acid. Thus the preferred additives are N,N-bis-(2-hydroxyethyl)oleamide, N-(2-hydroxyethyl)aminoethyl oleate and mixtures thereof. The diethanolamine derivatives suitable for use in the present invention include those taught in U.S. Pat. No. 4,204,481, incorporated herein by reference.

Preferably, the ratio of parts biodiesel per parts diethanolamine derivatives (wt/wt) is in the range of from about 10:1 to about 1:10.

The hydrocarbonaceous distillate fuels of the present invention include low sulfur-content middle distillate fuels such as diesel fuel and jet fuel, kerosene, gasoline including blends of gasoline and alcohols, and any other fuel which has a low sulfur-content and poor lubricity. In the present context the term "low sulfur-content fuel" is intended to mean fuels typically having a sulfur content of 0.2% by weight or less, preferably 0.05% by weight or less and, most preferably, 0.005% by weight or less. Middle distillate fuels are usually characterized as having a boiling range of 100° to 500° C., more typically from 150° to 400° C.

Typically, the concentration of the lubricity enhancing additive in the fuel falls in the range of from about 10 to about 10,000 ppm, preferably about 10 to about 5000 ppm, more preferably from about 25 to about 1500 ppm, and most preferably about 50 to about 400 ppm, on a weight/volume basis.

The present invention further provides for fuel compositions comprising a major amount of a low sulfur fuel and a minor amount of the lubricity enhancing additive as hereinbefore described. Such fuel is formulated by simple mixing of the base fuel and the additive in the desired proportions. For the sake of convenience, the additive may be provided as a concentrate for dilution with fuel. Such a concentrate forms part of the present invention and typically comprises from 99 to 1% by weight additive and from 1 to 99% by weight of solvent or diluent for the additive which solvent or diluent is miscible and/or capable of dissolving in the fuel in which the concentrate is to be used. The solvent or diluent may, of course, be the low sulfur fuel itself. However, examples of other solvents or diluents include white spirit, kerosene, alcohols (e.g. 2-ethyl hexanol, isopropanol and isodecanol), high boiling point aromatic solvents (e.g. toluene and xylene) and cetane improvers (e.g. 2-ethyl hexylnitrate). Of course, these may be used alone or as mixtures.

The concentrate or blended fuel may also contain other fuel additives in the appropriate proportions thereby providing a multifunctional fuel additive package. Examples of conventional fuel additives which may be used include fuel stabilizers, dispersants, detergents, antifoams, cold flow improvers, cetane number improvers, antioxidants, corrosion inhibitors, antistatic additives, biocides, dyes, smoke reducers, catalyst life enhancers and demulsifiers. The total treat rate for multifunctional formulations excluding the lubricity enhancing additive compounds described is typically about 200 to about 2000 ppm, preferably about 300 to about 1200 ppm.

A method of reducing fuel pump wear in an engine which operates on a low sulfur-content fuel, wherein said method comprises adding to and combusting in said engine a fuel composition according to the present invention.

The invention also provides a method of reducing fuel pump wear in an engine which operates on a low sulfur-content fuel, wherein said method comprises adding to and combusting in said engine a fuel composition described herein. The fuel may be used to reduce wear in rotary and in-line fuel pumps, for example as found in diesel engines, or in fuel transfer pumps. The latter are positioned between the fuel tank and the high pressure pump. The fuel is particularly well suited for reducing wear in fuel injector pumps. The fuel may also be used in the latest unit injectors which combine pump and injector mechanisms. The invention is particularly well-suited to the operation of diesel and jet engines.

The present invention is illustrated in the following Examples.

EXAMPLES

The efficacy of the lubricity additives of the present invention was assessed using the Scuffing BOCLE (ball-on-cylinder lubricity evaluator) test. This test is a modification of the standard aviation BOCLE test (ASTM method D5001: "Standard Test Method for Measurement of Lubricity of Aviation Turbine Fuels by the Ball-on-Cylinder Lubricity Evaluator (BOCLE)", ASTM Standards, Section 5, Vol 3, 1993) in which a load of 1 kg is applied to a fixed ball in contact with a rotating cylinder lubricated by the test fuel. In this standard test, fuel lubricity is assessed by measuring the size of the wear scar on the fixed ball resulting from the constant load contact with the cylinder. However, the standard BOCLE test suffers the disadvantage that the applied load is not high enough to model the type of severe wear failure that occurs in the field, for example in fuel injector pumps.

The Scuffing BOCLE test offers the advantage over the standard test of allowing discrimination and ranking of fuels of differing lubricity. The Scuffing test also simulates more closely the severe modes of wear failure encountered in fuel pumps than other fuel lubricity tests which run under mild wear conditions. The Scuffing BOCLE test therefore provides results which are more representative of how the fuel would behave in service.

In the Scuffing BOCLE test a load (0.25–8.0 kg) is applied to a fixed ball in contact with a rotating cylinder. The ball and cylinder are made of a standard grade steel. The cylinder rotates at 525 rpm. Since the temperature of the lubricating fuel can have a marked effect on the scuffing load, this is carefully controlled at 25° C. An air atmosphere with 50% relative humidity is used to blanket the ball on cylinder assembly. Following a thirty (30) second run-in period the load is applied to the ball for one minute. After this run, the ball is removed from the assembly and the type and size of wear scar examined by microscope. Further runs are then carried out using increased applied loads in a stepwise manner until scuffing wear failure occurs. The load at which wear failure occurs is referred to as the scuffing load and is a measure of the inherent lubricity of the fuel. The scuffing load is primarily identified by the size and appearance of the wear scar on the ball, which is considerably different in appearance to that found under milder non-scuffing conditions. Fuels giving a high scuffing load on failure have better lubricating properties than fuels giving a low scuffing load on failure.

Table 1 demonstrates the effectiveness of the additive combination of the present invention. Comparative Examples 1–5 are directed to base fuel containing no additive (C.1 and C.3), biodiesel alone, in this example soy diesel (C.2), or the diethanolamine derivative alone (C.4 and C.5). Comparative Example 2 contained the Base Fuel-1 set forth in Comparative Example 1. Examples 4–5 and Examples 6–11 contained the Base Fuel-2 of Comparative Example 3. Examples 6–11 demonstrate the improved lubricity obtained by using the additive combination of the present invention. Higher SBOCLE values are indicative of improved lubricity.

| Sample | Additive | Treat rate (ppm) | SBOCLE |
|---|---|---|---|
| C.1 | Base fuel-1 | — | 1,600 |
| C.2 | Soy diesel | 500 | 2,500 |
| C.3 | Base fuel-2 | — | 2,600 |
| C.4 | Amide[1] | 33 | 3,500*[4] |
| C.5 | Amide[1] | 65 | 3,667*[3] |
| 6 | Amide[2] + Soy | 33/17 | 3,400*[3] |
| 7 | Amide[2] + Soy | 65/35 | 3,500*[2] |
| 8 | Amide[3] + Soy | 17/33 | 3,100*[2] |
| 9 | Amide[3] + Soy | 35/65 | 3,500*[2] |
| 10 | Amide[4] + Soy | 17/33 | 3,300*[2] |
| 11 | Amide[4] + Soy | 35/65 | 3,600*[2] |

[1]Oleic acid diethanol amide
[2]Approximately 2:1 oleic acid diethanol amide/soy diesel
[3]Approximately 1:2 oleic acid diethanol amide/soy diesel
[4]Approximately 1:2 diethanol amide of tall oil fatty acid/soy diesel
*[x]: Average of X runs.

The fuels were subjected to the ASTM D-1094 water contact test. The D-1094 test consists of 20 ml of pH-7 buffered water and 80 ml additized fuel together in a 100 ml graduated cylinder. The cylinder is then shaken, horizontal, for 2 minutes using 2–3 5–10 inch strokes per second. After 2 minutes, the cylinder is set upright and the separation of water and fuel, the interface layer, and the fuel haze are rated. The fuels of Comparative Examples 4 and 5 exhibited some haze upon being subjected to the ASTM D-1094 water contact test, while the fuels containing the additive blends of the present invention (Examples 6–11) exhibited superior clarity upon the same testing. Further, it is clear from the above Table 1 that the additive blends of the present invention exhibit superior lubricity properties as compared to fuels containing soy diesel alone (Comparative Example 2), even when large amounts of the soy diesel are used as is evidenced by the higher SBOCLE results obtained in Examples 6–11. Therefore, the additive blends of the present invention allow one to obtain superior lubricity than soy diesel alone while also obtaining improved clarity compared to using the organic amide alone.

The additive compositions of the present invention were evaluated in the High Frequency Reciprocating Rig (HFRR) test to determine their effects on the fuel lubricity. The object of the HFRR is to assess the lubricating property of diesel fuels, including those which may contain lubricity enhancing additives, in order to assess the capacity of the fuel to minimize wear in the fuel injection equipment used in automotive and similar applications. The test is conducted on a test rig where a loaded 6 mm ball bearing is moved with a reciprocating motion over a static steel plate. The contacts are in flooded lubrication. The metallurgies, temperature, load, frequency, stroke length and ambient conditions are specified, and the size of the wear scar produced on the ball bearing is used as a measure of the fuel lubricity.

Table 2 sets forth the amount of soy diesel (SOY) and diethanolamine derivative (oleic acid diethanol amide) (AMIDE) added to the fuels as well as the mean wear scar diameter (MWSD). Comparative Example 1 is the base fuel containing no additives. Smaller scars are indicative of better fuel lubricity.

| | HFRR Results | | |
|---|---|---|---|
| | SOY/ppm | AMIDE/ppm | MWSD |
| Comparative Example 1 | 0 | 0 | 510 |
| Comparative Example 2 | 500 | 0 | 520 |
| Comparative Example 3 | 0 | 50 | 485 |
| Example 4 | 75 | 25 | 395 |
| Example 5 | 150 | 50 | 405 |

It is clear from the HFRR results in the above Table 2 that the additive blends of the present invention (Examples 4 and 5) exhibit unexpectedly improved lubricity as compared to base fuel or either additive used alone (Comparative Examples 1–3).

This invention is susceptible to considerable variation in its practice. Accordingly, this invention is not limited to the specific exemplifications set forth hereinabove. Rather, this invention is within the spirit and scope of the appended claims, including the equivalents thereof available as a matter of law.

The patentee does not intend to dedicate any disclosed embodiments to the public, and to the extent any disclosed modifications or alterations may not literally fall within the scope of the claims, they are considered to be part of the invention under the doctrine of equivalents.

We claim:

1. A fuel lubricity additive composition comprising a blend of (i) biodiesel, said biodiesel comprising lower alkyl esters of a mixture of saturated and unsaturated, straight-chain fatty acids of from 12 to 22 carbon atoms, derived from vegetable or oleaginous seeds, and (ii) a diethanolamine derivative, wherein said diethanolamine derivative is selected from the group consisting of fatty acid amides of diethanolamine, fatty acid esters of diethanolamine and mixtures thereof.

2. The additive composition of claim 1 wherein the diethanolamine derivative is selected from the group consisting of N,N-bis-(2-hydroxyethyl)oleamide, N-(2-hydroxyethyl)aminoethyl oleate and mixtures thereof.

3. The additive composition of claim 1 wherein the biodiesel is soy diesel.

4. The additive composition of claim 1 wherein the biodiesel and diethanolamine derivative are present in a ratio (wt/wt) of 10:1 to 1:10.

5. An additive concentrate comprising from 99 to 1% by weight of the additive composition of claim 1 and 1 to 99% by weight of a solvent or diluent.

6. The additive concentrate of claim 5 which further comprises at least one additive selected from the group consisting of fuel stabilizers, dispersants, detergents, antifoams, cold flow improvers, cetane number improvers, antioxidants, corrosion inhibitors, antistatic additives, biocides, dyes, smoke reducers, catalyst life enhancers and demulsifiers.

7. A fuel composition comprising a major amount of a low sulfur fuel and a minor amount of the fuel lubricity additive of claim 1, wherein the low sulfur fuel has a sulfur content of 0.2% by weight or less.

8. The fuel composition of claim 7 wherein the low sulfur fuel is selected from the group consisting of diesel fuel, jet fuel, kerosenes, gasoline and blends of gasoline and alcohols.

9. The fuel composition of claim 8 wherein the low sulfur fuel has a sulfur content of 0.05% by weight or less.

10. The fuel composition of claim 7 wherein the lubricity additive blend is present in the fuel in an amount of from 10 to about 10,000 ppm on a weight/volume basis.

11. The fuel composition of claim 7 which further comprises at least one additive selected from the group consisting of fuel stabilizers, dispersants, detergents, antifoams, cold flow improvers, cetane number improvers, antioxidants, corrosion inhibitors, antistatic additives, biocides, dyes, smoke reducers, catalyst life enhancers and demulsifiers.

* * * * *